Nov. 1, 1955   O. BRUMMER ET AL   2,722,439
UNITARY SEAL DEVICE
Filed Aug. 28, 1952
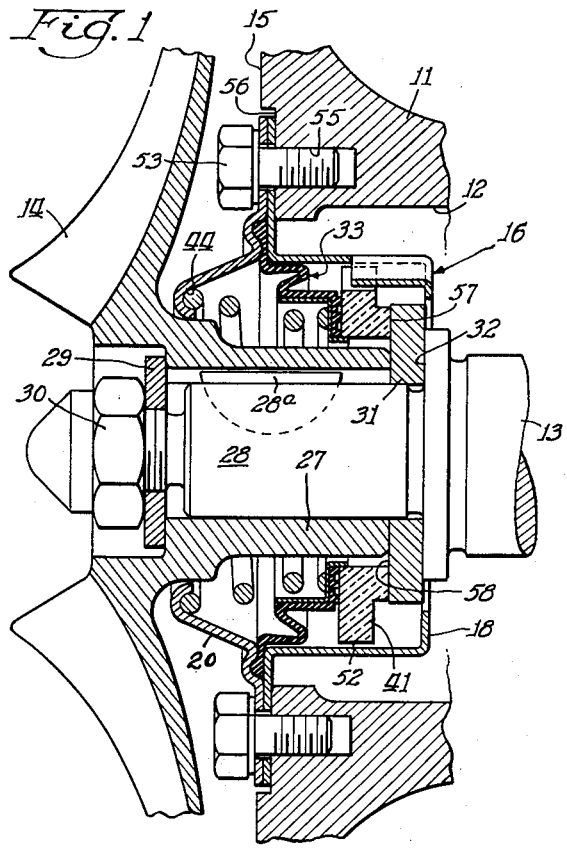
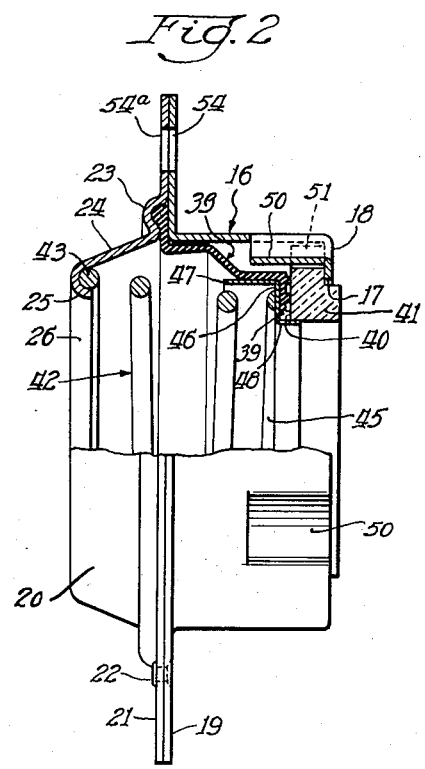
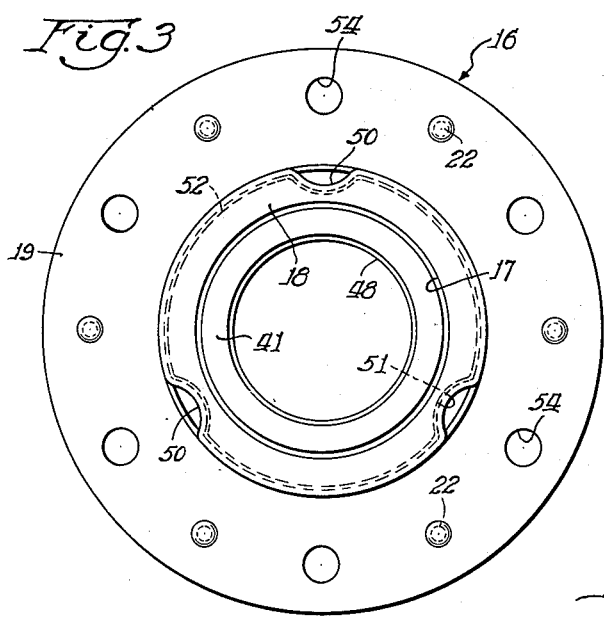
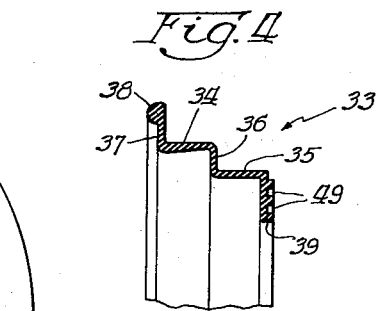
Inventors:
Olin Brummer and
Elmer F. Heimbuch
By: Jones, Tesch + Darbo
Attys.

United States Patent Office 2,722,439
Patented Nov. 1, 1955

2,722,439

UNITARY SEAL DEVICE

Olin Brummer and Elmer F. Heimbuch, Chicago Heights, Ill.; said Heimbuch assignor, by mesne assignments, to Brummer Seal Company, a corporation of Illinois Application August 28, 1952, Serial No. 306,892

2 Claims. (Cl. 286—11)

This invention relates to a unitary seal device for a rotary shaft and more particularly a device of this class adapted for heavy duty such as to prevent the passage of fluid along and around a shaft, as, for example, in water pumps for diesel motor equipment.

The invention aims to provide a sealing device which is advantageously completely pre-assembled at the factory and may be shipped to the engine manufacturer as a complete self-contained unit mountable in its predetermined position in only one way and with a minimum of labor while being securely held in position against accidental displacement or damage, the seal parts being completely contained within a permanent housing which serves the threefold function of, a protection for the seal parts, a mounting means for the device as a whole, and an anchorage for one end of the seal diaphragm independently of the spring which presses against the other end of the seal diaphragm.

These and other advantages will be apparent from the following description, taken together with the accompanying drawings, showing an illustrative embodiment of the invention, and in which drawings—

Figure 1 is a fragmentary axial section, which may be, say, full size, through a portion of a water pump and showing my improved unitary seal device therewith;

Figure 2 is a side view partially in section of the unitary seal device itself;

Figure 3 is an end view of the device of Fig. 2 looking at the device from the right-hand side of Fig. 2; and Figure 4 is a fragmentary axial sectional view of the extendible and contractible boot following the present invention.

Referring in detail to the illustrative construction shown in the drawings, the numeral 11 may indicate a water pump element having a counterbore 12 for the rotatable shaft 13 of the impeller 14, egress of water from the impeller chamber 15 of which is desired to be sealed against escape through the counterbore 12 and along the shaft 13. It is for this purpose that the device of the present invention is adapted.

In accordance with the present invention, our unitary seal device here illustrated comprises a cup-like casing 16 having an opening 17 through its rear wall 18 and having an annular brim 19 at its other end. Partially closing the casing 16 at its last mentioned end is a cover plate 20 having an annular rim 21. The brim 19 and rim 21 are lappingly secured together as by rivets 22 (Fig. 3) spaced apart circumferentially around the mating faces of the brim and rim. The cover plate 20 has an annular corrugation 23 at its juncture with the brim 19 and is tapered inwardly from its rim, as at 24, this tapered or conoidal portion terminating in a turned in annular reverse bend margin 25 which provides an opening 26 centrally through the cover plate 20 axially aligned with the opening 17 through the casing 16.

The casing and cover plate just described are illustrative of a pair of axially aligned complementary annular metallic members jointly forming a seal housing and adapted to be disposed about the hub 27 of the impeller 14 which is keyed to rotate with the journal 28 of the shaft 13 as by a feather 28a. At one end, the hub 27 may be locked on the journal 28 by a washer 29 and nut 30, and, at the other end, the hub 27 may abut against a metallic collar 31 that is pressed against a shoulder 32 on the shaft 13 when the nut 30 is tightened, thus drawing up these parts into close relationship substantially impervious to passage of water from the impeller chamber 15 along the journal 28.

The seal of the present invention serves to prevent the passage of water from the impeller chamber 15 through the space represented by the bore 12 between the pump element 11 and the hub 27 of the impeller. For this purpose, the unitary seal structure 16—20 houses a boot 33 of rubber or rubber-like material and advantageously one of the well known synthetic elastomers which may be molded under the influence of heat and pressure and which when set resists deterioration under heat and cold and other destructive agencies, while at the same time being extendible and contractible by reason of a central sleeve-like portion which in this instance has one cylindrical section 34 and a smaller cylindrical section 35 joined by a radially extending annular portion 36.

Further in accordance with the present invention, the boot 33 at one end has an outwardly extending flange 37 which terminates in an annular bead 38, the latter being received in the corrugated portion 23 of the cover plate 20 and securely and permanently clamped between the rim of the cover plate and the brim of the casing 16 when these parts are riveted together as already described. At its other end, the boot 33 has an inwardly extending flange 39 which abuts the inner face 40 of an annular sealing disc or washer 41 disposed in the opening 17 of the casing 16. The washer 41 can be formed of a suitable material having resistance to wear and low frictional characteristics, such as a phenolic condensation resin impregnated with graphite.

Still further in accordance with the present invention, the unitary seal devices includes, housed within the member 16—20, a coil spring 42 one end of which as by an end coil 43 is lodged in the groove 44 provided by the reverse bend turned-in margin 25 of the cover plate 20. The other end of the spring 42, as by end coil 45, presses against the inwardly directed flange 39 of the boot 33 to press this flange sealingly against the face 40 of the washer 41. The spring, for uniformity of action against the boot flange 39 may desirably press thereagainst through the intermediation of a metallic spring clip 46, and for further uniformity of action the spring clip 46 may have an axially cylindrical band-like part 47 upon which the cylindrical part 35 of the boot seats and another cylindrical band-like part 48 of smaller diameter upon which the washer 41 seats with the boot flange 39 between the washer and the main radially extending part of the clip 46.

To enhance the seal between the flange 39 of the boot and the sealing washer 41, the flange face may be provided with concentric suction grooves 49.

In order to further carry out the unitary character of the present device, means are provided for inhibiting relative rotative movement between the washer 41 and the casing 16 while permitting relative axial movement thereof, by means known to the art, such as indentations 50 in the casing 16 at its rear end which are received in notches 51 in the washer periphery 52, these interengaging formations being spaced apart, as in three places, around the circumference of the washer. While inward relative axial movement of the washer 41 with respect to the casing 16 is desired, from its outer-most position as at Fig. 2 when the device is unmounted, further outward movement of the washer from this position is desired to be inhibited so that the parts are held together as a unit and so that the spring 42 even in this position of the parts before installation of the device may be under some compression if desired. For this purpose the washer 41 is locked against such further outward movement by the annular end wall or inturned margin 18 of the casing 16 which laps the outer radial margin of the washer 41 adjacent its peripheral edge 52.

Following the present invention, the unitary seal device shown in Fig. 2, for example, may be assembled and shipped complete from the factory to the manufacturer which is building the pump, for example, and may be readily installed in its operative position as shown in Fig. 1 by means of threaded studs or screws 53 which pass through pre-formed aligned perforations 54 and 54a in the brim 19 and rim 21 of the casing and cover plate 20 respectively. These perforations are permanently aligned when the brim and rim are riveted. Such aligned perforations may be desirably spaced around the faces of the brim and rim alternated with rivets 22 securing these parts together as already referred to. The studs 53 pass into pre-formed threaded openings 55 in the pump element 11, and, when drawn up tightly, clamp the unitary device of the present invention against the annular margin 56 of the pump element so that escape of water therebetween is prevented. The margin 56 is desirably recessed as shown to further this sealing engagement and locate the sealing device in position.

One of the complementary sealing areas of the device is at the first face 57 of the sealing washer 41 which is closely lapped to make a smooth sealing engagement with the similarly lapped sealing face 58 of the metallic collar 31 on the shaft 13, the collar and sealing washer being in relative rotative engagement as is well known. The other complementary sealing area is at the permanent inter-lock of the housing members and the boot on the flange 37 of the latter. It will be understood that the boot may be contracted, as in Fig. 1, when the device is installed, so that the spring 42 may cause the boot to extend with the sealing washer when wear or disturbances of the parts occur in service, and thus to cause the device to accommodate itself to such wear or disturbances while maintaining the seal at all times.

The invention is not limited to details of construction shown for purposes of exemplification, and such changes may be made as fall within the scope of the appended claims without departing therefrom.

What is here claimed is:

1. In a unitary seal device of the class described, a cup-like casing having an opening through its rear wall and having an annular brim at its other end, a cover plate for the last mentioned end including an annular rim on the cover plate lapping said brim, said cover plate having a portion tapering radially inwardly and axially outwardly from said rim and having a central opening therethrough aligned with the opening in the casing, the cover plate margin about its opening being turned inwardly upon itself to provide a groove and the cover plate rim being of corrugated formation adjacent its juncture with the brim, an annular boot of elastomeric material within the casing and having at one end a radially outwardly turned flange received between the casing brim and cover plate rim, said flange having an annular bead received in said corrugated formation, the brim and rim being secured together to clamp the boot flange between said casing and coverplate, a radially inwardly turned flange at the other end of the boot, a coil spring lodged at one end in the groove of the in-turned margin of the cover plate and pressing at its other end against the inwardly turned flange of the boot, and aligned perforations in the brim and rim for mounting the device.

2. In a unitary seal device of the class described, a cup-like casing having an opening through its rear wall and having an annular brim at its other end, a cover plate for the last mentioned end including an annular rim on the cover plate lapping said brim, said cover plate having a portion tapering radially inwardly and axially outwardly from said rim and having an opening therethrough aligned with the opening in the casing, the cover plate margin about its opening being turned inwardly upon itself to provide a groove and the cover plate rim being of corrugated formation adjacent its juncture with the brim, an annular boot of elastomeric material within the casing and having at one end an outwardly turned flange received between the casing brim and cover plate rim, said flange having an annular bead received in said corrugated formation, an inwardly turned flange at the other end of the boot, a coil spring lodged at one end in the groove of the in-turned margin of the cover plate and pressing at its other end against the inwardly turned flange of the boot, a sealing washer in the casing in abutment with said inwardly turned flange of the boot and pressed by said spring toward the rear wall of the casing, said rear wall limiting axial outward movement of the washer in the casing, interengaging means on the casing and washer inhibiting rotary movement of the washer with respect to the casing while permitting relative axial movement, and means retaining said brim and said rim in engagement and clamping the outwardly turned boot flange therebetween.

References Cited in the file of this patent

UNITED STATES PATENTS

| 2,120,922 | Rasmussen | June 14, 1938 |
| 2,347,118 | Matter | Apr. 18, 1944 |
| 2,399,764 | Schilling | May 7, 1946 |
| 2,447,930 | Biggs | Aug. 24, 1948 |
| 2,521,102 | Vedovell | Sept. 5, 1950 |
| 2,522,231 | Loftis | Sept. 12, 1950 |
| 2,610,872 | Hayes | Sept. 16, 1952 |

FOREIGN PATENTS

| 558,576 | Great Britain | Jan. 11, 1944 |